(12) United States Patent
Holcomb et al.

(10) Patent No.: US 6,456,637 B1
(45) Date of Patent: Sep. 24, 2002

(54) WAVEGUIDE LASERS AND OPTICAL AMPLIFIERS HAVING ENHANCED THERMAL STABILITY

(75) Inventors: Douglas P. Holcomb, Morris Plains, NJ (US); Jane Deborah LeGrange, Princeton, NJ (US); Gerald E. Tourgee, Convent Station, NJ (US); Eva Milar Vogel, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 182 days.

(21) Appl. No.: 09/580,094

(22) Filed: May 30, 2000

(51) Int. Cl.[7] .......................... H01S 3/17; H01S 3/094; H04B 10/12

(52) U.S. Cl. .......................... 372/40; 372/41; 372/75; 372/6; 359/341.3

(58) Field of Search .................. 372/6, 40, 41, 372/70, 71, 75; 359/160, 341.1, 341.3, 341.33

(56) References Cited

U.S. PATENT DOCUMENTS

| | | | | |
|---|---|---|---|---|
| 5,500,764 A | * | 3/1996 | Armitage et al. | 359/341 |
| 6,157,663 A | * | 12/2000 | Wu et al. | 372/75 |
| 6,185,235 B1 | * | 2/2002 | Cheng et al. | 372/39 |
| 6,226,308 B1 | * | 5/2002 | Samson et al. | 372/40 |

FOREIGN PATENT DOCUMENTS

| | | |
|---|---|---|
| EP | 0 893 862 A2 | 7/1998 |
| JP | 09186383 | 7/1997 |

* cited by examiner

*Primary Examiner*—Paul Ip
*Assistant Examiner*—James Menefee
(74) *Attorney, Agent, or Firm*—Lowenstein Sandler, PC

(57) ABSTRACT

In accordance with the invention, a waveguide laser or amplifier having a peak absorption wavelength is provided with pump emitters having wavelengths deliberately offset from the peak absorption wavelength. The offset wavelengths of the emitters are chosen to enhance the thermal stability of the laser or amplifier. In one exemplary embodiment, the laser or amplifier is pumped by a bimodal distribution of emitters.

5 Claims, 4 Drawing Sheets

US 6,456,637 B1

WAVEGUIDE LASERS AND OPTICAL AMPLIFIERS HAVING ENHANCED THERMAL STABILITY

FIELD OF THE INVENTION

This invention relates to optical waveguide lasers and amplifiers and, in particular, to waveguide lasers and amplifiers having enhanced thermal stability.

BACKGROUND OF THE INVENTION

Optical waveguide lasers and amplifiers are important components in optical communication systems. They are critical components in transmitters, receivers and intermediate amplifiers. It is important that the lasers and amplifiers in such components be stable in both wavelength and power.

A typical waveguide laser or amplifier comprises a length of glass optical fiber doped with one or more rare earth dopants such as erbium and/or ytterbuim. The doped fiber has an absorption band due to the rare earth dopants, and it is pumped by light from a plurality of semiconductor light emitters such as light emitting diodes. The efficiency of the laser or amplifier depends on the overlap between the absorption band of the fiber and the output spectra of the pump emitters.

A difficulty with waveguide lasers and amplifiers in communication systems is their sensitivity to changes in temperature. As the emitters heat up, their output spectra shift to higher wavelengths. At the same time, their output powers decrease. These variations change the laser or amplifier output power and the response of the transmitter or receiver employing them. Accordingly there is a need for waveguide lasers and amplifiers having enhanced thermal stability.

SUMMARY OF THE INVENTION

In accordance with the invention, a waveguide laser or amplifier having a peak absorption wavelength is provided with pump emitters having wavelengths deliberately offset from the peak absorption wavelength. The offset wavelengths of the emitters are chosen to enhance the thermal stability of the laser or amplifier. In one exemplary embodiment, the laser or amplifier having a peak absorption is pumped by a bimodal distribution of emitters having output peaks on the short wavelength side and the long wavelength side of the waveguide absorption peak.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

Figure 1:
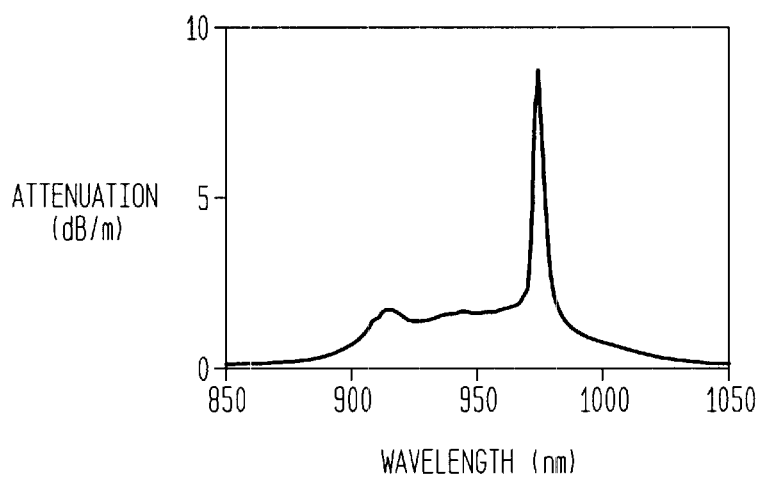
FIG. 1 is a graphical illustration useful in understanding the problem to which the invention is directed.

FIG. 1 illustrates a typical absorption spectrum for Er/Yb fiber. The width at half maximum of the peak at 975 nm is on the order a few nm. This is significantly narrower than the output of a single diode (which is typically about 6 nm). As can be seen, if a diode output spectrum initially at 975 nm shifts in wavelength away from the absorption peak, the output power of the amplifier would drop. The spectral output of typical diodes can shift as much as 0.5 nm per degree C. Should all the diodes be selected at 975 nm for highest absorption per unit length of fiber, the amplifier would be very sensitive to temperature changes which would shift the output spectra away from peak absorption for even small temperature changes.

In addition to wavelength changes, the output power of the diodes is also affected by temperature. As the diode temperature increases, holding drive current constant, the output power decreases.

In accordance with the invention the pump diodes have output peaks deliberately offset from the absorption peak. Typically the offset will be in the range of 0.5% to 1% of the peak absorption wavelength. This selection can be made to ensure that when the temperature drifts, the offset diodes will shift to overlap with the absorption peak and thus compensate for the temperature drift. For example, if temperature drifted below a center point (i.e. 25° C.), diodes of emission wavelengths greater than the absorption peak would shift down for greater overlap with the peak which would compensate for diodes on the other side of the peak shifting further off peak. Because of the asymmetry in the waveguide absorption peak, 50–80% of the diode power is advantageously on the short wavelength side of the peak absorption wavelength.

Using a numerical model of the dependence of diode output on temperature, one can optimize the distribution of diode wavelengths to achieve minimum sensitivity of amplifier output power on temperature.

Figure 2A:
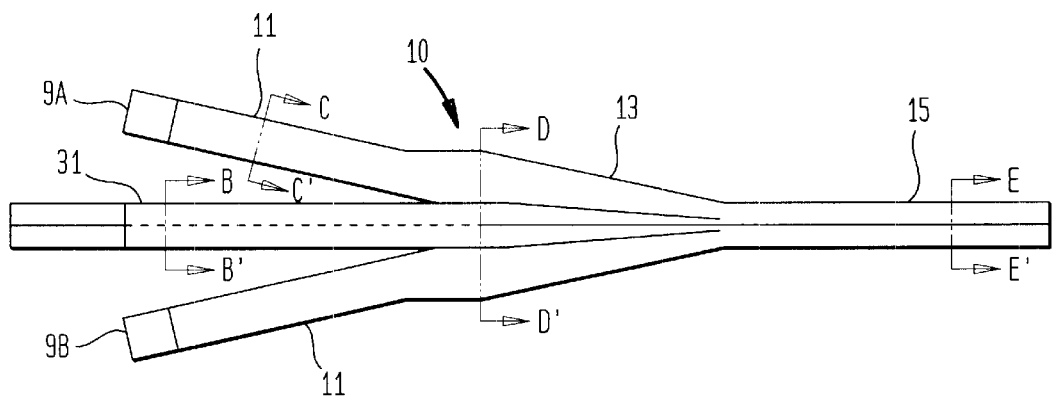
FIGS. 2A–2E schematically illustrate an optical waveguide amplifier having enhanced thermal stability.

FIGS. 2A–2E are schematic diagrams of an exemplary waveguide optical amplifier 10 having enhanced thermal stability. FIG. 2A is longitudinal view and FIGS. 2B–2E show pertinent cross sections. The amplifier 10 comprises a length of optical waveguide 15 doped with rare earth dopants such as $Er^{+3}$ and $Yb^{+3}$ or co-doped with a mixture of these dopants. Advantageously it is a cladding pumped fiber amplifier.

Figure 2B:
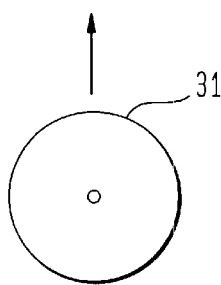
Figure 2C:
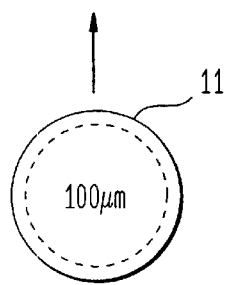
Figure 2D:
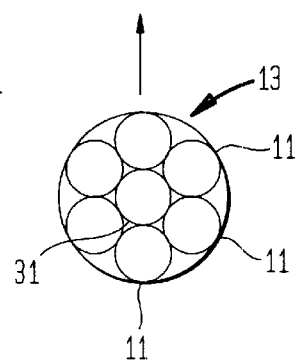
Figure 2E:
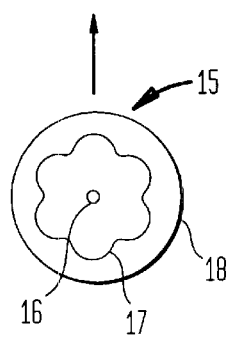

As shown in FIG. 2E (a cross-section across E–E'), the waveguide 15 is a glass optical fiber comprising a single mode core 16 forming a gain medium due to the presence of the rare earth dopants, and the core 16 is situated within a first layer of cladding 17 and an outer layer of cladding 18 having a reduced index of refraction. The outer cladding 18 can be made of fluorinated, low index polymer. The double cladding structure ensures waveguiding of pump light.

The waveguide 15 is pumped by a plurality of semiconductor diodes 9A, 9B via a respective plurality of multimode fibers 11 fusion spliced to a tapered fiber bundle 13.

As best shown in FIG. 2D, the tapered fiber bundle 13 comprises a plurality of multimode input fibers 11 (here 6) and a single mode fiber 31 for carrying the signal to be amplified. The fibers 11 and 31 are fused together in a single structure 13 which is tapered down to match the size and numerical aperture (N.A.) of the cladding pumped fiber 15. Typically the length of the doped fiber 15 is chosen so that at least 90% of the pump light is absorbed by the doped core. FIGS. 2C and 2B show the cross sections of fibers 11 and 31.

The plurality of pump emitters comprises emitters 9A providing pump light at a first relatively short wavelength shorter than the peak absorption wavelength and emitters 9B providing pump light at a second relatively long wavelength longer than the peak absorption wavelength. The first and second wavelengths provide a bimodal distribution of pump light wavelength that reduces the thermal sensitivity of the amplifier. As a representative example, for a doped fiber having a peak absorption wavelength at 975 nm, the emitters 9A can be at 970 nm and the emitters 9B can be at 978 nm. Preferably ⅔ of the emitters are at 970 nm and ⅓ at 978.

Figure 3:
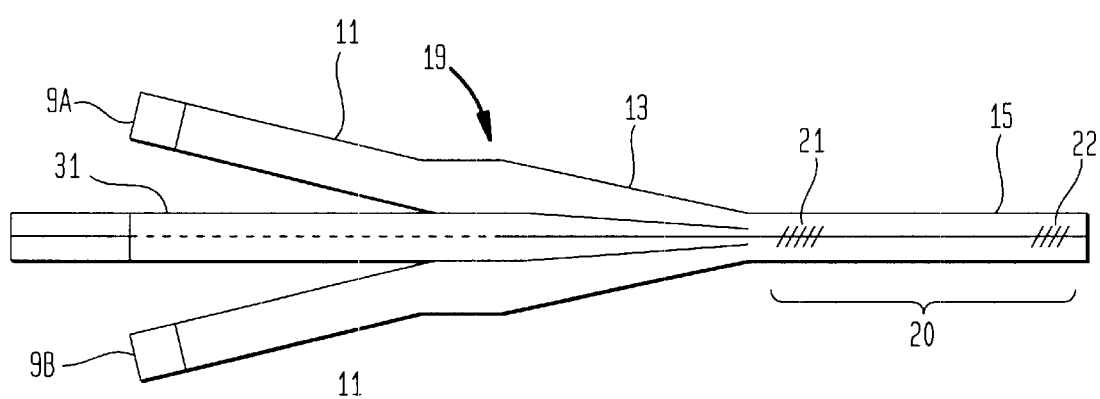
FIG. 3 is a schematic illustration of an optical waveguide laser having enhanced thermal stability.

FIG. 3 is a schematic longitudinal view of an optical waveguide laser 19 having enhanced thermal ability. The laser 19 is essentially the same as the amplifier of FIG. 2 except that waveguide 15 is provided with an optical cavity 20 formed, for example, by a pair of Bragg gratings 21 and 22.

Figure 4:
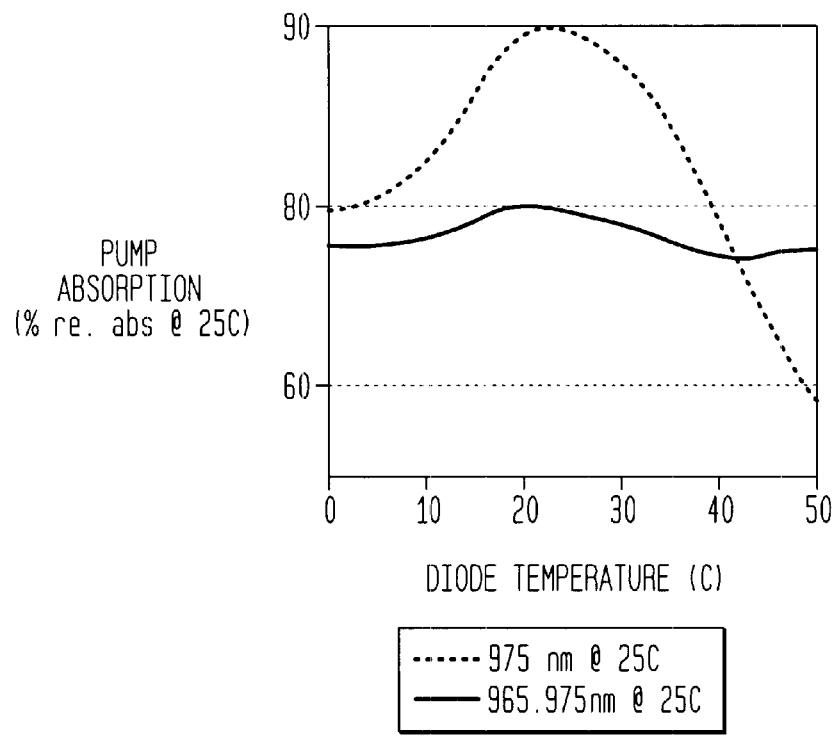
FIGS. 4–6 are graphical illustrations useful in explaining the operation of the devices of FIGS. 2 and 3.

FIG. 4 shows results of modeling the absorption for two different wavelength distributions: one in which the diode center wavelengths are all the same (975 nm) and a second bimodal one in which a number of the diodes are at each of two different wavelengths (⅔ at 965 and ⅓ at 975 nm). Although absorption of pump light is highest if all diodes are at 975 nm, the first arrangement is very sensitive to temperature. The bimodal solution, on the other hand, is very insensitive to temperature, although a longer length of fiber would be required to achieve the desired pump absorption. Based on these results, pump diodes are selected in two groups with peaks blue and red shifted with respect to the absorption maximum. The amplifier or laser is then be built such that the diodes pumping each rare-earth doped fiber section 15 would be split between the two wavelengths of the distribution. The model can also be used to fine tune the number of diodes that should be at each wavelength.

There are two important temperature effects to be considered: change in diode output power with temperature and change in diode wavelength with temperature. Below we describe an approach to selecting a subset of diodes such that the two effects offset each other.

The key is to define a figure of merit (FOM) which quantifies the degree of temperature. insensitivity achieved over a specified temperature range $\Delta T$ between minimum $T_{min}$ and maximum $T_{max}$ temperatures. If we write the total pump absorption in the fiber as Abs(T), then the mean absorption is $$\mu_{Abs} = \int_{T_{min}}^{T_{max}} Abs(T) dT$$

We then define the figure of merit to be the root-mean-square deviation of the absorption from the mean:

$$FOM_{Abs} = \sqrt{\frac{1}{\Delta T} \int_{T_{min}}^{T_{max}} (Abs(T) - \mu_{Abs})^2 dT}$$

The goal is to minimize this FOM, thereby minimizing the temperature sensitivity. The perfect solution achieves $FOM_{Abs}=0$, although this is not achievable in general.

The manner in which Abs(T) is affected, and therefore $FOM_{Abs}$ minimized, is described here.

P(T) is diode power as a function of temperature, T, for constant diode drive current.

$\lambda(T)$ is diode (center) wavelength as a function of temperature, and $A(\lambda)$ is the fraction of pump absorbed in a given length of fiber as a function of diode wavelength, $\lambda$.

Then the total pump absorption in the fiber, from a single diode, denoted by i, is:

$Abs_i(T)=P_i(T)* A(\lambda_i(T))$ $Abs(T)-P(T)*A(\lambda(T))$

Figure 5:
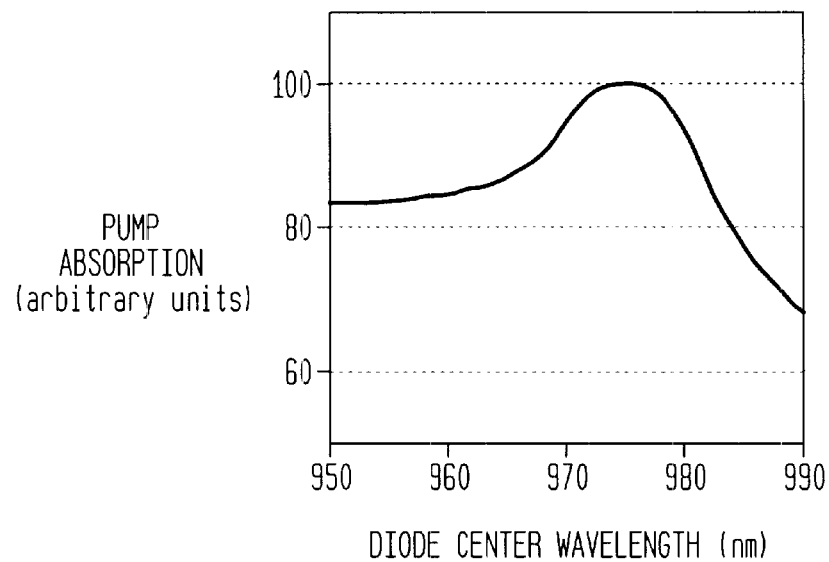

And, for a group of diodes, denoted by the index i $Abs(T)=$ sum over i of $[P_i(T)*A(\lambda_i(T))]$ A diode user can't control the P(T) or $\lambda(T)$, but can affect $A(\lambda_i(T))$ by choosing diodes based on pump wavelength at some reference temperature. This is illustrated in FIG. 5 which shows that the dependence of A on $\lambda$ can be quite different in different wavelength ranges. The goal is to select the individual $\lambda_i$ so as to achieve Abs(T) as nearly constant as possible, over the range of temperature ($\Delta T$) needed. If $\Delta T$ is small enough, all of the three functions P, $\lambda$ and A are nearly linear within that temperature range, and the problem can be addressed by considering only derivatives:

$$\frac{d\,Abs}{dT} \approx \frac{\partial P}{\partial T} + \frac{\partial \lambda}{\partial T} \times \sum_i \left[\frac{\partial A}{\partial \lambda}\right].$$

For temperature insensitivity, dA/dT=0, so the $\lambda_i$ are selected to obtain the $\partial A/\partial \lambda_i$ which achieve this.

As $\Delta T$ becomes large enough, the diode wavelength range $\Delta \lambda$ increases and $A(\lambda)$ is no longer close to linear over the temperature range. Therefore, the $\lambda_i$ must be selected to manage the curvature of $A(\lambda)$ (second derivative) as well as the slope. How well the approach achieves the desired temperature sensitivity is determined by the FOM value achieved.

Figure 6A:
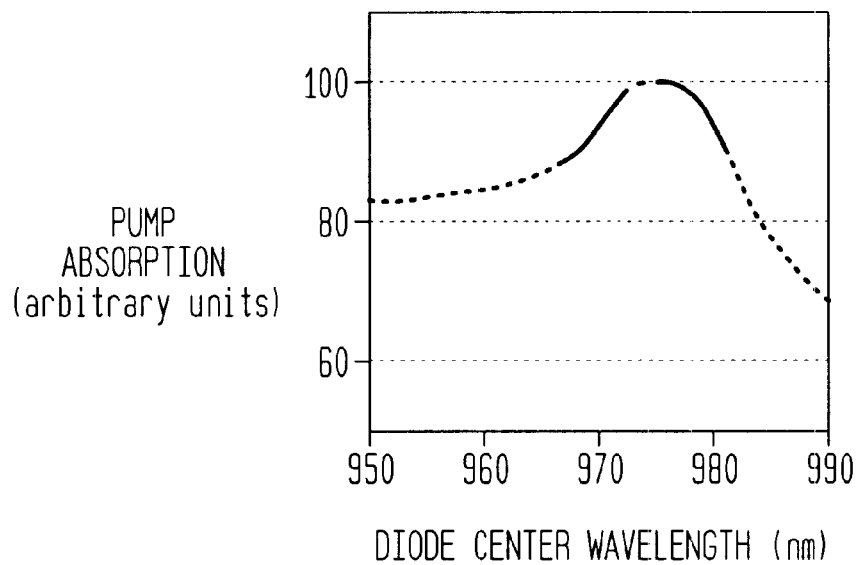
Figure 6B:
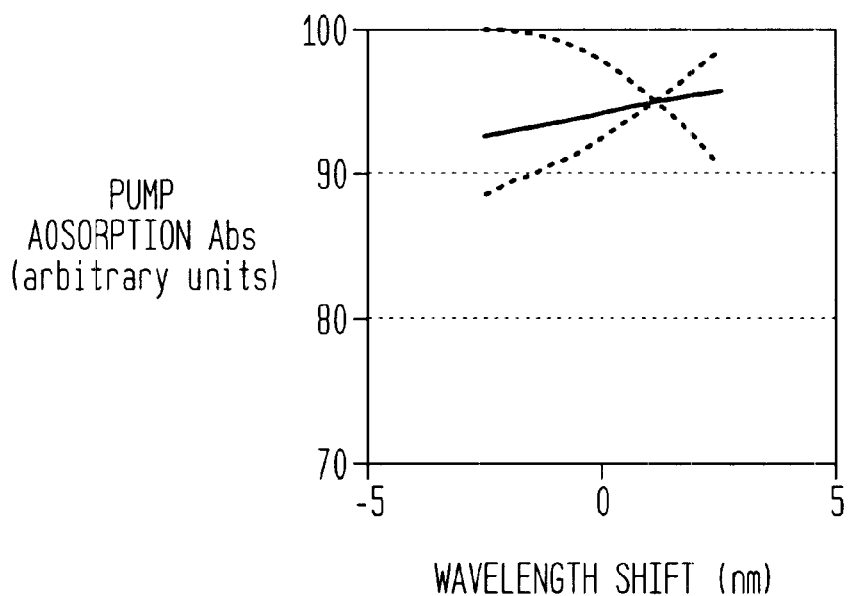

FIGS. 6A and 6B illustrate two ranges of $A(\lambda)$, corresponding to different $\lambda_i$, chosen to have offsetting curvatures and to produce (when summed) a particular slope. The solid curve is based on the summation of the individual (dotted) curves. The result in FIG. 6B is a very linear absorption response as wavelength shifts. In this case, the number of diodes at the two wavelengths is not the same.

It is to be understood that the above-described embodiments are illustrative of only a few of the many possible specific embodiments, which can represent applications of the principles of the invention. Numerous and varied other arrangements can be readily devised by those skilled in the art without departing from the spirit and scope of the invention.

What is claimed:

1. An optical waveguide laser or amplifier comprising:
    a length of rare earth doped optical waveguide having a peak absorption wavelength
    a first plurality of semiconductor pump emitters having light output wavelengths offset from the peak absorption wavelength by 0.5–1.0% to the short wavelength side of the absorption peak;
    a second plurality of semiconductor pump emitters having light output wavelengths offset from the peak absorption wavelength by 0.5–1.0% to the long wavelength side of the absorption peak; and,
    the first plurality of semiconductor pump emitters and the second plurality of semiconductor pump emitters are spaced in wavelength about the waveguide peak absorption wavelength such that when the contribution of the light from one plurality of semiconductor pump emitters changes with temperature, the contribution of the light from the other plurality of semiconductor pump emitters changes in a complementary way for stabilizing light output with temperature.

2. An optical waveguide laser or amplifier according to claim 1 wherein the first plurality of pump emitters provides 50–80% of the pump power.

3. An optical waveguide laser or amplifier according to claim 1 wherein the optical waveguide is doped with erbium.

4. An optical waveguide laser or amplifier according to claim 1 wherein the optical waveguide is doped with ytterbium.

5. An optical waveguide laser or amplifier according to claim 1 wherein the optical waveguide is co-doped with erbium and ytterbium.

* * * * *